United States Patent

Spalding

[15] 3,639,149

[45] Feb. 1, 1972

[54] COMPOSITE LAMINATE OF WATER-EXTENDED UNSATURATED POLYESTER

[72] Inventor: Richard Elliot Thornton Spalding, South Norwalk, Conn.

[73] Assignee: American Cyanamid Company, Stamford, Conn.

[22] Filed: Oct. 28, 1970

[21] Appl. No.: 84,918

[52] U.S. Cl. ............... 117/76 F, 117/138.8 UA, 156/196, 161/93, 161/189, 161/195, 161/233

[51] Int. Cl. ........................... B32b 27/06, B44d 1/14

[58] Field of Search ................. 117/72, 76 F, 138.8 UA; 156/196; 161/93, 189, 195, 233; 260/29.2 UA

[56] References Cited

UNITED STATES PATENTS

| 3,354,238 | 11/1967 | Schmitt et al. | 260/876 |
| 3,356,253 | 12/1967 | Wimmer | 220/64 |
| 3,454,417 | 7/1969 | Pascale | 117/73 |

*Primary Examiner*—John T. Goolkasian
*Assistant Examiner*—Robert A. Dawson
*Attorney*—James T. Dunn

[57] ABSTRACT

A process for producing a laminated article that is either flat or thermoformed comprising prime coating a thermoformable or thermoformed flexible thermoplastic sheet with a neat unsaturated polyester resin composition and depositing on said prime coating at least one layer of fiberglass reinforced water-extended polyester resin composition and permitting the two polyester resins to convert to the thermoset state.

10 Claims, No Drawings

COMPOSITE LAMINATE OF WATER-EXTENDED UNSATURATED POLYESTER

BACKGROUND OF THE INVENTION

Unsaturated polyester resin compositions have been known for a plurality of years and these polyester resins are prepared by reacting an α, β-ethylenically unsaturated dicarboxylic acid and a polyhydric alcohol, preferably a glycol, with or without a dicarboxylic acid free of nonbenzenoid unsaturation. These unsaturated polyester resins are generally admixed with a cross-linking agent which is in the nature of a polymerizable monomer containing a

group and having a boiling point of at least about 60° C. These polyester resins can be used for laminating purposes, particularly when used in combination with a thermoformable or thermoformed flexible comparatively rigid thermoplastic sheet. The plastic sheet is available from a plurality of commercial sources and is generally made from methyl methacrylate as a polymethyl methacrylate. The polyester resins are applied to these thermoformed or thermoformable plastic sheets with a filler such as glass fibers, in order to impart rigidity to the ultimate object.

1. Field of the Invention

The present invention is in the field of laminates prepared from a thermoplastic sheet that has been thermoformed to the desired shape and which has been rigidized by having applied thereto an unsaturated polyester resin composition containing glass fibers.

2. The description of the Prior Art

The most representative references relating to the unsaturated polyester resins used in the laminate of the present invention are the U.S. Pat. Nos. 2,255,313 and 2,443,735-41 inclusive. Representative patents showing unsaturated polyester resins in which promoters are used are illustrated by the U.S. Pat. Nos. 2,818,400, 2,822,343 and 2,830,966. Illustrative of U.S. patents showing water-extended polyester resins are the U.S. Pat. No. 2,443,735 referred to hereinabove, as well as the U.S. Pat. No. 2,505,353 and the U.S. Pat. No. 3,256,219. Illustrative of patents showing the manufacture of polymethyl methacrylate, especially by a continuous casting process are the U.S. Pat. Nos. 2,500,728 and 3,376,371. A modified polymethyl methacrylate sheet with grafted butadiene therein is shown in the U.S. Pat. No. 3,354,238. Illustrative of patents showing laminated articles in which reinforced polyester resins are deposited on a thermoformed thermoplastic sheet are the British Pat. No. 904,763 and the U.S. Pat. No. 3,356,253. All of these patents are incorporated herein by reference.

SUMMARY OF THE INVENTION

This invention relates to a process for producing a laminated article comprising prime coating a thermoformable or thermoformed, flexible, comparatively rigid thermoplastic sheet with a neat unsaturated polyester resin composition containing a polymerizable compound having a polymerizable

group, at least 0.4 percent of a polymerization promoter and a polymerization catalyst, depositing on said coating at least one layer of fiberglass reinforced, water-extended unsaturated polyester composition containing a polymerizable compound having a polymerizable

group, at least 0.4 percent of a polymerization promoter, a polymerization catalyst and permitting the resin to cure to the thermoset state on said sheet. This invention also relates to part produced by the process set forth hereinabove.

In the preparation of the unsaturated polyester resin compositions of the present invention, one should make use of the alpha, beta unsaturated polycarboxylic acids such as maleic, fumaric, aconitic, itaconic, monochloro maleic anhydride and the like. These unsaturated acids should be present in an amount approximating at least 15 percent by weight of the total weight of the polycarboxylic acids used and preferably in amounts varying between about 20 percent and 65 percent by weight based on the total weight of polycarboxylic acid present. If it is desired to make use of saturated polycarboxylic acids, that is, those which are free of nonbenzenoid unsaturation, one could use such acids as phthalic, malonic, succinic, glutaric, sebacic and chlorinated polycarboxylic acids such as tetrachlorophthalic anhydride, hexachloroendomethylene tetrahydrophthalic acid and the like but in amounts less than about 85 percent by weight of the total amount of polycarboxylic acid present. Whenever available the anhydrides of these acids may be used or mixtures of the acids or mixtures of the anhydrides thereof.

As polyhydric alcohols which may be used to prepare the unsaturated polyesters of the present invention, it is preferred to make use of those alcohols having only two hydroxy groups although minor amounts of alcohols having three hydroxy groups, four hydroxy groups or more hydroxy groups may be used in minor amounts. As dihydroxy alcohols, one could use ethylene glycol, diethylene glycol, propylene glycol, dipropylene glycol, butanediol-1,4, butanediol-1,3, butanediol-1,2, pentanediol-1,2, pentanediol-1,3 pentanediol-1,4, pentanediol-1,5, hexanediol-1,6, and the like. Additionally, one could use glycerol, pentaerythritol, dipentaerythritol and the like.

The modifier for the polyester resin is a polymerizable material having a

group. Amongst these polymerizable compounds are styrene, side chain-substituted styrenes such as the alpha methylstyrene, alpha ethylstyrene and the like or ring-substituted styrenes such as ortho, meta and paralkyl styrenes such as o-methylstyrene, p-ethylstyrene, metapropylstyrene, 2,4-dimethylstyrene, 2,5-diethylstyrene, and the like. Still further, one can make use of the allyl compounds such as diallyl phthalate, allyl alcohol, methallyl alcohol, allyl acetate, allyl methacrylate, diallyl carbonate, allyl lactate, allyl alpha-hydroxyisobutyrate, allyl trichlorosilane, allyl acrylate, diallyl malonate, diallyl oxalate, diallyl gluconate, diallyl methylgluconate, diallyl adipate, diallyl sebacate, diallyl tartronate, diallyl tartrate, diallyl mesaconate, diallyl citraconate, the diallyl ester of muconic acid, diallyl itaconate, diallyl chlorophthalate, diallyl dichlorosilane, the diallyl ester of endomethylene tetrahydrophthalic anhydride, triallyl tricarballylate, triallyl aconitate, triallyl cyanurate, triallyl citrate, triallyl phosphate, trimethallyl phosphate, tetraallyl silane, tetraallyl silicate, hexaallyl disiloxane, and the like.

In the preparation of the unsaturated polyester resins of the present invention, it is unnecessary to use a catalytic material as the acids and the dihydric alcohols will readily react at elevated temperatures to produce the polyester resin. When the unsaturated polyester resin is combined with the polymerizable monomeric material, however, it is desirable to incorporate therein a polymerization inhibitor in order to prevent premature gelation of the resinous composition, particularly if it is expected that said composition will be subjected to prolonged periods of storage or if it is expected that it will be subjected to temperatures significantly higher than room temperature. With the polymerization inhibitor, the resinous composition will remain stable at room temperature for months without noticeable deterioration. Amongst the polymerization inhibitors which may be used are any of those which are conventionally known and used in the art such as hydroquinone, benzaldehyde, ascorbic acid, isoascorbic acid, resorcinol, tannin, symmetrical di-(beta-naphthyl)-p-phenylene diamine, phenolic resins, sulfur compounds and the like. The concentration of the inhibitor is preferably low and as a general rule less than 1 percent by weight is usually sufficient. However, with the preferred inhibitors, e.g., polyhydric phenols and aromatic amines, one may make use of such small amounts as 0.01–0.1 percent by weight.

The unsaturated polyester resins of the present invention will find application in a great plurality of fields such as in the preparation of laminates and other reinforced plastics, coating compositions, adhesive compositions, molding compositions, potting and the like. These polyester resins can readily be solidified without benefit of catalyst by the application of heat or by the application of heat and pressure. However, in such an operation without benefit of a catalytic agent the time element makes it desirable to incorporate into the composition conventional polymerization catalysts such as the organic superoxides, the alcoholic and acidic peroxides. Among the preferred catalysts are: the acidic peroxides, e.g., benzoyl peroxide, phthalic peroxide, succinic peroxide and benzoyl acetic peroxide; fatty oil acid peroxides, e.g., coconut oil acid peroxides, lauric peroxide, stearic peroxide and oleic peroxide; alcohol peroxides, e.g., tertiary-butyl hydroperoxide, usually called tertiary-butyl peroxide and terpene oxides, e.g., ascaridole. Still other polymerization catalysts might be used in some instances, e.g., methyl ethyl ketone peroxide and other ketone peroxides and hydroperoxides such as hydrogen peroxide and cumene hydroperoxide and ditertiary-butyl peroxide.

Since it is desired, one should use a promoter in combination with the catalytic agent in order to accelerate the cure of the polymerizable polyester resin composition to a thermoset state. Among the promoters which may be utilized are the cobalt salts such as cobalt naphthenate or those disclosed in the U.S. Pat. Nos. 2,466,800 and 2,480,928. Particularly advantageous are the mercaptans such as n-hexyl mercaptan, n-heptyl mercaptan, n-octyl mercaptan, n-nonyl mercaptan, n-decyl mercaptan, n-undecyl mercaptan, n-dodecyl mercaptan, n-tridecyl mercaptan, n-tetradecyl mercaptan, n-hexadecyl mercaptan, secondary hexyl mercaptan, tertiary hexyl mercaptan, tertiary octyl mercaptan, and the like. The dialkyl substituted anilines are additionally useful as promoters, particularly dimethyl aniline, diethyl aniline, dipropyl aniline, dibutyl aniline and the like. Obviously, these promoters can be used either singly or in combination with one another. Ordinarily, these catalyst promoters are used in very small quantities such as from about 0.005 to about 0.2 percent by weight of the catalyst promoter based on the total weight of the polyester resinous composition. This amount is generally sufficient to obtain the desired curing cycle. Ordinarily, one would use about 0.01 to about 0.1 percent by weight of the promoter. The promoter may be introduced into the resinous composition at any time prior to the cure thereof. The quantity set forth hereinabove of promoters ordinarily used in polyester resin compositions is shown in the U.S. Pat. No. 2,822,343. The promoter content in both of the polyester resins used to make the laminate of the present invention, namely the prime coating as well as the rigidizing layer will have a significantly larger quantity of promoter present, such as between about 0.4 and 1.5 percent by weight based on the total weight of the polyester resinous composition. It is preferred to use between about 1.0 and 1.25 percent by weight same basis. It is theorized that these promoters in these large amounts not only function as a catalyst promoter but also function as a surfactant for the water-extended polyester resins. If desired, an additional surfactant that is a nonpromoter could be used.

The unsaturated polyester resin that is used as the prime coating is used as a neat resin, that is it contains no solvent other than the polymerizable monomer which functions as a reactive solvent and of course becomes a part of the total resin molecule when it is converted from the thermosetting to the thermoset state. The prime coat does not have to be the same polyester resin as is used as the water-extendable polyester resin although it may be if desired. And in fact it is preferred that the prime coat be of the same class that is used to make the water-extendable resin.

The thermoformable or thermoformed flexible, comparatively rigid thermoplastic sheet which is used to make the laminates of the present invention may be a cast sheet or an extruded sheet of polymethyl methacrylate or modifications thereof. Other thermoplastic sheets such as polyvinyl chloride, polyvinylidene chloride, polyvinyl fluoride, polyvinylidene fluoride among others may be used. If the thermoplastic sheet is to be thermoformed it may be so converted by using a method such as that set forth in the U.S. Pat. No. 2,917,783 or other conventional processes. Said patent is incorporated herein by reference. If it is desired to make a straight flat panel, the thermoplastic sheet is not thermoformed before the application of the prime coating and the application of the subsequent fiberglass containing coating of the unsaturated polyester resin composition. Such a flat sheet would require only the use of a comparatively thin sheet of the thermoplastic material such as those produced by extrusion of the thermoplastic material through an aperture having a measurement or thickness of about 5–50 mils and preferably one having an opening of about 20–30 mils. The ultimate laminate produced from such a thin film of thermoplastic sheet could be utilized as a wall panel and pigments and other coloring materials could be incorporated into the sheet so as to impart the desired color thereto.

If the thermoformable, flexible, comparatively rigid thermoplastic sheet is to be thermoformed, it must be thermoformed before the prime coating is applied thereto. Such thermoplastic sheet should have a thickness before the thermoforming operation is begun, varying between about one-fourth inch thick to about five-eighth inch thick. After the thermoforming operation has been completed, such thermoformed thermoplastic sheet would have a thickness of about 5–50 mils and preferably between about 20–30 mils as in the type of sheet used for the nonthermoformed laminate. The thermoformed laminates of the present invention are used for boat hulls, such as sail boat hulls or power boat hulls. They may also be used as the body of a sand dune buggy or as a kitchen sink with one or two wells or as a camper top or as a bath tub or modular shower stall or shower stall-tub combination.

In order that the concept of the present invention may be more completely understood, the following examples are set forth in which all parts are parts by weight wherever parts are used. These examples are set forth primarily for the purpose of illustration and any specific enumeration of detail contained therein should not be interpreted as limitations on the case except as is indicated in the appended claims.

RESIN A

A water-extendable polyester resin is prepared by coreacting 3.99 mols of isophthalic acid, 0.21 mol of adipic acid, 3.1 mols of propylene glycol, 2.95 mols of diethylene glycol and 0.22 mol of dipropylene glycol to an acid number of about 10–15. To the resulting mixture there is then added 1.80 mols of maleic anhydride and coreacted with it until esterification is essentially complete as is indicated by an acid number of about 10–15. To 46 parts by weight of the resulting polyester there is added 54 parts by weight of monomeric styrene, 0.0046 part of hydroquinone, 0.02 part of toluhydroquinone, 0.0012 part of a commercially available solution of copper naphthenate containing about 8 percent copper, 0.2 part of a commercially available thixotropic agent, 0.1 part of diethyl ethanolamine, 2.0 parts of a commercially available wetting agent, 1.50 parts of a commercially available solution of cobalt octoate containing about 12 percent cobalt and 0.5 part of dimethyl aniline.

RESIN B

A water-extendable polyester resin is prepared by coreacting 3.60 mols of phthalic anhydride, 0.40 mol of adipic acid, 5.87 mols of propylene glycol, and 0.61 mol of diethylene glycol to an acid number of about 10–15. There is then added 2.0 mols of maleic anhydride to the resulting mixture and coreacted with it until esterification is essentially complete as is indicated by an acid number of about 10–15. To 47 parts by weight of the resulting polyester there is added 53 parts of monomeric styrene, 0.005 part of hydroquinone, 0.4 part of diethyl ethanolamine, 0.2 part of the thixotropic agent, 2.0 parts of a wetting agent, 1.25 parts of a commercially available solution of cobalt octoate containing about 12 percent cobalt, and 0.5 part of dimethyl aniline.

RESIN C

Resin C is a commercially available water-extendable polyester resin containing the esterification reaction product of isophthalic acid, fumaric acid and propylene glycol cut with monomeric styrene.

RESIN D

Resin D is a commercially available water-extendable polyester resin containing the esterification reaction product of isophthalic acid, fumaric acid, diethylene glycol and propylene glycol cut with monomeric styrene.

EXAMPLE 1

A 0.040 inch thick, white pigmented, modified polymethyl methacrylate sheet* *The modified polymethyl methacrylate sheet is composed of a physical blend of (A) 70–95 percent of a hard resinous terpolymer composed of from about 67–72 parts of methyl methacrylate, 18–22 parts of styrene and 8–12 parts of acrylonitrile and (B) 5–30 percent of polybutadiene grafted with from about 76–80 parts of methyl methacrylate, 17–21 parts of styrene and 1–5 parts of an acrylonitrile such as acrylonitrile per se or methacrylonitrile. The ratio of the polybutadiene to monomer (B) ranges from about 2:1 to about 3:1 respectively. Certain of these polymeric sheets contain 20 percent grafted rubber, 10 percent grafted rubber or 5 percent grafted rubber. is prime coated on one face with a neat unsaturated polyester Resin A catalyzed with 1 percent of benzoyl peroxide. A ply of 1½ oz. fiberglass mat is placed on the resin wet face and the mat is saturated with a water-resin emulsion formed from polyester Resin A and an equal weight of water, the emulsion having been catalyzed with 0.5 percent of methyl ethyl ketone peroxide by weight based on the resin content before application to the glass mat. Two additional plies of glass mat are applied and saturated with the catalyzed water-resin emulsion successively. The resin is cured at ambient room temperature for 24 hours. The peel strength of the resulting composite is 13.6 in.–lbs./in.

COMPARATIVE EXAMPLE 2

Example 1 is repeated in all essential details except that the application of the prime coat step is omitted, the thermoplastic sheet being coated with the water-resin emulsion before the glass mat is applied. The peel strength of the composite fabricated from identical materials is only less than 0.2 in.–lbs./in.

EXAMPLE 3

A composite structure is prepared as in example 1 using Resin B catalyzed with 3 percent benzoyl peroxide as the prime coat resin and a water-resin emulsion consisting of 100 parts of Resin B, 100 parts of water and 0.5 part of methyl ethyl ketone peroxide. The peel strength of the resulting composite after cure is comparable to that of composites prepared according to examples 1, 5, 7, and 9 rather than to that of composite prepared according to comparative examples 2, 4, 6, and 8.

COMPARATIVE EXAMPLE 4

A composite structure is prepared as in example 3 except that the application of the prime coat is omitted and using the water-resin emulsion consisting of 100 parts of Resin B and 100 parts of water and 0.5 part of methyl ethyl ketone peroxide. After the cure period of 24 hours, the peel strength of the resulting composite is less than 0.2 in.–lbs./in.

EXAMPLE 5

A composite structure is prepared as in example 1 using a water-resin emulsion consisting of 77 parts of Resin C, 7.7 parts of methyl methacrylate, 15.3 parts of glass beads, 100 parts of water and 0.5 part of methyl ethyl ketone peroxide. The peel strength of the resultant composite after cure was 9.6 in.–lbs./in.

COMPARATIVE EXAMPLE 6

A composite structure is prepared as in example 5 except that the application of the prime coat is omitted and using a water-resin emulsion consisting of 77.0 parts of Resin C, 7.7 parts of methyl methacrylate, 1.53 parts of glass beads, 100 parts of water and 0.5 parts of methyl ethyl ketone peroxide. Upon cure in a 24 hour period, the peel strength of the resulting laminate is less than 0.2 in.–lbs./in.

EXAMPLE 7

A composite structure is prepared as in example 1 using a water-resin emulsion consisting of 100 parts of Resin D, 100 parts of water and 0.5 part of methyl ethyl ketone peroxide. Peel strength of the resulting composite after cure is 12.4 in.–lbs./in.

COMPARATIVE EXAMPLE 8

A composite structure is prepared according to example 7 except that the application of the prime coat is omitted and using a water-resin emulsion consisting of 100 parts of Resin D, 100 parts of water and 0.5 part of methyl ethyl ketone peroxide. After curing for 24 hours at ambient temperatures, the peel strength of the resultant composite is less than 0.2 in.–lbs./in.

EXAMPLE 9

A composite structure is prepared as in example 3 using Resin C catalyzed with 2 percent benzoyl peroxide as the prime coat resin and a water-resin emulsion consisting of 100 parts of Resin C, 0.02 part of toluhydroquinone, 100 parts of water and 0.5 part of methyl ethyl ketone peroxide. The peel strength of the resulting composite is comparable to that of the composite prepared according to examples 1, 3, 5, and 7 inclusive rather than to that of composite prepared according to comparative examples 2, 4, 6, and 8 inclusive.

I claim:

1. A process for producing a laminated article comprising prime coating a thermoformable or thermoformed, flexible, comparatively rigid thermoplastic sheet with a neat unsaturated polyester resin composition containing a polymerizable compound having a polymerizable

group, at least 0.4 percent of a polymerization promoter and a polymerization catalyst, depositing on said coating at least one layer of fiberglass reinforced, water-extended unsaturated polyester resin composition containing a polymerizable compound having a polymerizable

group, at least 0.4 percent of a polymerization promoter, a polymerization catalyst and permitting the resin to cure to the thermoset state on said sheet.

2. The process according to claim 1 in which the thermoplastic sheet is a physical blend of (A) 70–95 percent of a hard resinous terpolymer composed of from about 67–72 parts of methyl methacrylate, 18–22 parts of styrene and 8–12 parts of acrylonitrile and (B) 5–30 percent by weight of polybutadiene grafted with from about 76–80 parts of methyl methacrylate, 17–21 parts of styrene and 1–5 parts of acrylonitrile wherein the ratio of the polybutadiene to monomer in (B) ranges from about 2:1 to about 3:1 respectively.

3. The process according to claim 1 in which the thermoplastic sheet is thermoformed before the prime coating is applied.

4. The process according to claim 1 in which the thermoplastic sheet is flat and not thermoformed before the prime coating is applied.

5. The process according to claim 2 in which the thermoplastic sheet is thermoformed before the prime coating is applied.

6. The process according to claim 2 in which the thermoplastic sheet is not thermoformed before the prime coating is applied.

7. The process according to claim 1 in which the original thickness of the thermoformable sheet is between about one-fourth and five-eighths inch.

8. The process according to claim 4 in which the thickness of the thermoplastic sheet is between about 5 and 50 mils.

9. The process according to claim 3 in which the thermoplastic sheet after the thermoforming step has been accomplished, is between about 5 and 50 mils.

10. A laminate comprising a thermoformed flexible, comparatively rigid thermoplastic sheet having on one side a prime coating of a neat unsaturated polyester resin composition containing a polymerizable compound having a polymerizable

group, and at least one layer of fiberglass reinforced, water-extended unsaturated polyester resin composition containing polymerizable compound having a polymerizable

group deposited on said prime coating, wherein all of said polyester compositions are in the thermoset state and all layers are securely bonded to one another.

* * * * *